US012375867B2

(12) United States Patent
Simón et al.

(10) Patent No.: US 12,375,867 B2
(45) Date of Patent: Jul. 29, 2025

(54) LOUDSPEAKER CONTROL

(71) Applicant: Audioscenic Limited, Southampton (GB)

(72) Inventors: Marcos Simón, Southampton (GB); Ioseb Laghidze, Southampton (GB); Tyler Ward, Southampton (GB); Andreas Franck, Southampton (GB); Filippo Fazi, Southampton (GB); Daniel Wallace, Southampton (GB)

(73) Assignee: AUDIOSCENIC LIMITED, Southampton (GB)

( * ) Notice: Subject to any disclaimer, the term of this patent is extended or adjusted under 35 U.S.C. 154(b) by 230 days.

(21) Appl. No.: 18/175,206

(22) Filed: Feb. 27, 2023

(65) Prior Publication Data

US 2023/0276186 A1 Aug. 31, 2023

(30) Foreign Application Priority Data

Feb. 28, 2022 (GB) ...................................... 2202753

(51) Int. Cl.
*H04S 7/00* (2006.01)
*H04R 1/40* (2006.01)
*H04R 3/12* (2006.01)

(52) U.S. Cl.
CPC ............. *H04S 7/303* (2013.01); *H04R 1/403* (2013.01); *H04R 3/12* (2013.01); *H04S 2420/01* (2013.01)

(58) Field of Classification Search
None
See application file for complete search history.

(56) References Cited

U.S. PATENT DOCUMENTS 10,158,960 B1 * 12/2018 Møller ..................... H04R 5/02
10,708,653 B1 7/2020 Stinson et al.
(Continued)

FOREIGN PATENT DOCUMENTS

CN 106255031 A 12/2016
EP 2161950 A2 3/2010
(Continued)

OTHER PUBLICATIONS

Van Veen, B.D., and Buckly, K.M., "Beamforming: A Versatile Approach to Spatial Filtering," IEEE, ASSP Magazine, No. 5, pp. 4-24 (Apr. 1988).
(Continued)

*Primary Examiner* — Duc Nguyen
*Assistant Examiner* — Assad Mohammed
(74) *Attorney, Agent, or Firm* — Hamilton, Brook, Smith & Reynolds, P.C.

(57) ABSTRACT

There is provided a computer-implemented method of generating audio signals for an array of loudspeakers positioned in a listening environment, the method comprising: receiving at least one input audio signal; determining at least one of: a number of users in the listening environment, or a respective position of each of one or more users in the listening environment; based on the at least one of the number of users or the respective position of each of the one or more users in the listening environment, selecting a sound reproduction mode from a set of predetermined sound reproduction modes of the array of loudspeakers, wherein the set of predetermined sound reproduction modes comprises one or more user-position-independent modes and one or more user-position-dependent modes; and generating a respective output audio signal for each of the loudspeakers in the array of loudspeakers based on at least a portion of the at least one input audio signal, wherein the output audio
(Continued)

signals are generated according to the selected sound reproduction mode.

18 Claims, 11 Drawing Sheets

(56) References Cited

U.S. PATENT DOCUMENTS

| | | | | |
|---|---|---|---|---|
| 2004/0240676 | A1 | 12/2004 | Hashimoto et al. | |
| 2006/0262935 | A1* | 11/2006 | Goose | H04S 3/002 381/17 |
| 2010/0150361 | A1 | 6/2010 | Kim et al. | |
| 2011/0316996 | A1 | 12/2011 | Abe et al. | |
| 2014/0270187 | A1 | 9/2014 | Hall et al. | |
| 2016/0014540 | A1 | 1/2016 | Kelly et al. | |
| 2016/0080885 | A1 | 3/2016 | Hampiholi et al. | |
| 2016/0117962 | A1* | 4/2016 | Jung | G09G 3/20 345/156 |
| 2018/0054174 | A1 | 2/2018 | Son et al. | |
| 2019/0090060 | A1* | 3/2019 | Fazi | H04R 5/04 |
| 2019/0230435 | A1* | 7/2019 | Maeno | H04S 7/303 |
| 2019/0394569 | A1 | 12/2019 | Moore | |
| 2020/0008002 | A1 | 1/2020 | Sahay et al. | |
| 2020/0178015 | A1* | 6/2020 | McGrath | H04R 5/04 |
| 2020/0280815 | A1 | 9/2020 | Suenaga et al. | |
| 2021/0204085 | A1 | 7/2021 | Claar | |
| 2021/0385605 | A1 | 12/2021 | Fazi et al. | |
| 2023/0007424 | A1 | 1/2023 | Fazi et al. | |

FOREIGN PATENT DOCUMENTS

| | | | | |
|---|---|---|---|---|
| EP | 3024252 | A1 | 5/2016 | |
| EP | 3046341 | A1 | 7/2016 | |
| EP | 3920557 | A1 | 12/2021 | |
| JP | 2010-011269 | A | 1/2010 | |
| JP | 2017-123650 | A | 7/2017 | |
| WO | 2012/068174 | A2 | 5/2012 | |
| WO | 2014/151817 | A1 | 9/2014 | |
| WO | 2017158338 | A1 | 9/2017 | |
| WO | 2020/030304 | A1 | 2/2020 | |
| WO | 2021/021460 | A1 | 2/2021 | |
| WO | WO-2021257282 | A1 * | 12/2021 | G06F 3/011 |

OTHER PUBLICATIONS

Hamdan E. C., et al., "Three-channel Crosstalk Cancellation Mode Efficiency for Sources in the Far-Field," Audio Engineering Society, Conference Paper 81, 10 pages (2019).
Simón Gálvez, Marcos F et al., "Time Domain Optimization of Filters Used in a Loudspeaker Array for Personal Audio," IEEE/ACM Transactions on Audio, Speech, and Language Processing, vol. 23, No. 11, 10 pages (Nov. 2015).
Simón Gálvez, Marcos F. et al., "A Robustness Study For Low-Channel-Count Cross-Talk Cancellation Systems," Audio Engineering Society Conference Paper 74, 9 pages (2019).
Audioscenic Limited, UK patent application No. 2008547.8—Loudspeaker Control, Jun. 5, 2020, 1-48.
Combined Search and Examination Report under Sections 17 and 18(3) for GB2202753.6, dated Aug. 24, 2022.
Extended European Search Report for EP 23158654.6, dated Jul. 25, 2023.

* cited by examiner

LOUDSPEAKER CONTROL

RELATED APPLICATION

This application claims priority under 35 U.S.C. § 119 or 365 to Great Britain Application No. GB 2202753.6, filed Feb. 28, 2022. The entire teachings of the above application are incorporated herein by reference.

FIELD

The present disclosure relates to a method of generating audio signals for an array of loudspeakers and a corresponding apparatus and computer program.

BACKGROUND

A loudspeaker array may be used to reproduce input audio signals in a listening environment using a variety of signal processing algorithms, depending on the type of audio signal to be reproduced and the nature of the listening environment.

SUMMARY

Aspects of the present disclosure are defined in the accompanying independent claims.

BRIEF DESCRIPTION OF THE DRAWINGS

Examples of the present disclosure will now be explained with reference to the accompanying drawings in which.

Throughout the description and the drawings, like reference numerals refer to like parts.

DETAILED DESCRIPTION

In general terms, the present disclosure relates to a method of generating audio signals for an array of loudspeakers in which a sound reproduction mode of the array is selected based on a number and/or positions of users in a listening environment. The present disclosure relates primarily to ways of selecting the sound reproduction mode.

Figure 1:
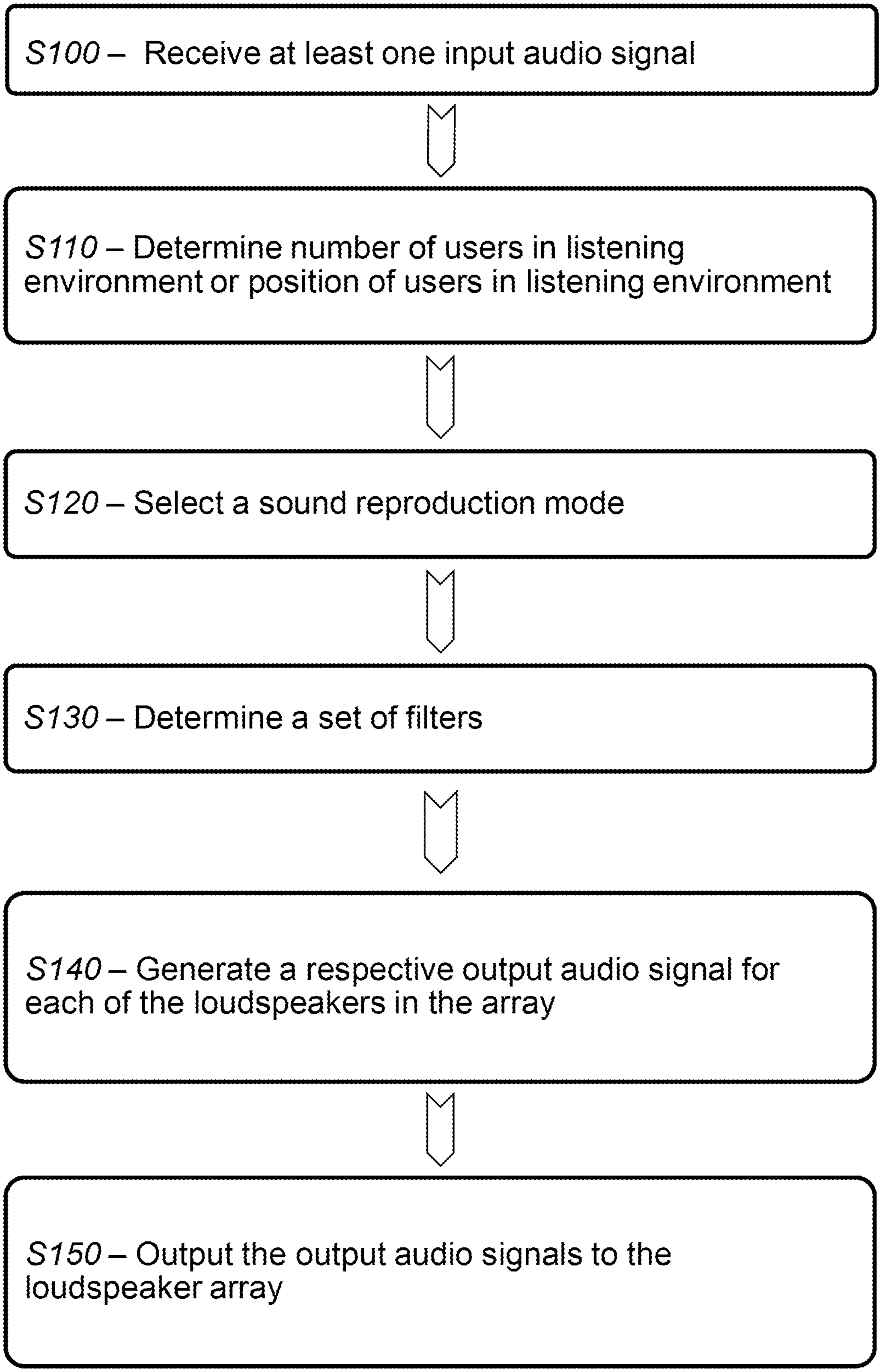
FIG. 1 shows a method of generating audio signals for an array of loudspeakers.

A method of generating audio signals is shown in FIG. 1. The signals are for an array of loudspeakers positioned in a listening environment.

At step S100, at least one input audio signal (or 'input signal') is received.

The at least one input audio signal may take many forms, depending on the application. For example, the at least one input audio signal may comprise at least one of: a multichannel audio signal; a stereo signal; an audio signal comprising at least one height channel; a spatial audio signal; an object-based spatial audio signal; a lossless audio signal; or a first input audio signal and an equalised version of the first input audio signal. As a result of this variety of forms of the at least one input audio signal, and the availability of more than one loudspeaker in the array of loudspeakers, there is a corresponding variety of ways in which the at least one input audio signal may be output to the array of loudspeakers.

At step S110, a number of users in the listening environment, and/or a respective position of each of one or more users in the listening environment, are determined.

It should be noted that the determination of a respective position of each of one or more users in the listening environment does not necessarily require the determination of a number of users in the listening environment. For example, it can be assumed that there are two users in the listening environment, and a respective position of each of these two users may be determined without necessarily determining that there are actually two users in the listening environment.

As will be explained in more detail, at step S120, a sound reproduction mode (or 'digital signal processing mode', or 'DSP mode', or 'reproduction mode', or 'sound mode') is selected from a set of predetermined sound reproduction modes of the array of loudspeakers.

The sound reproduction mode is selected based on (or 'according to') the number of users and/or the respective position of each of the one or more users in the listening environment.

Figure 6:
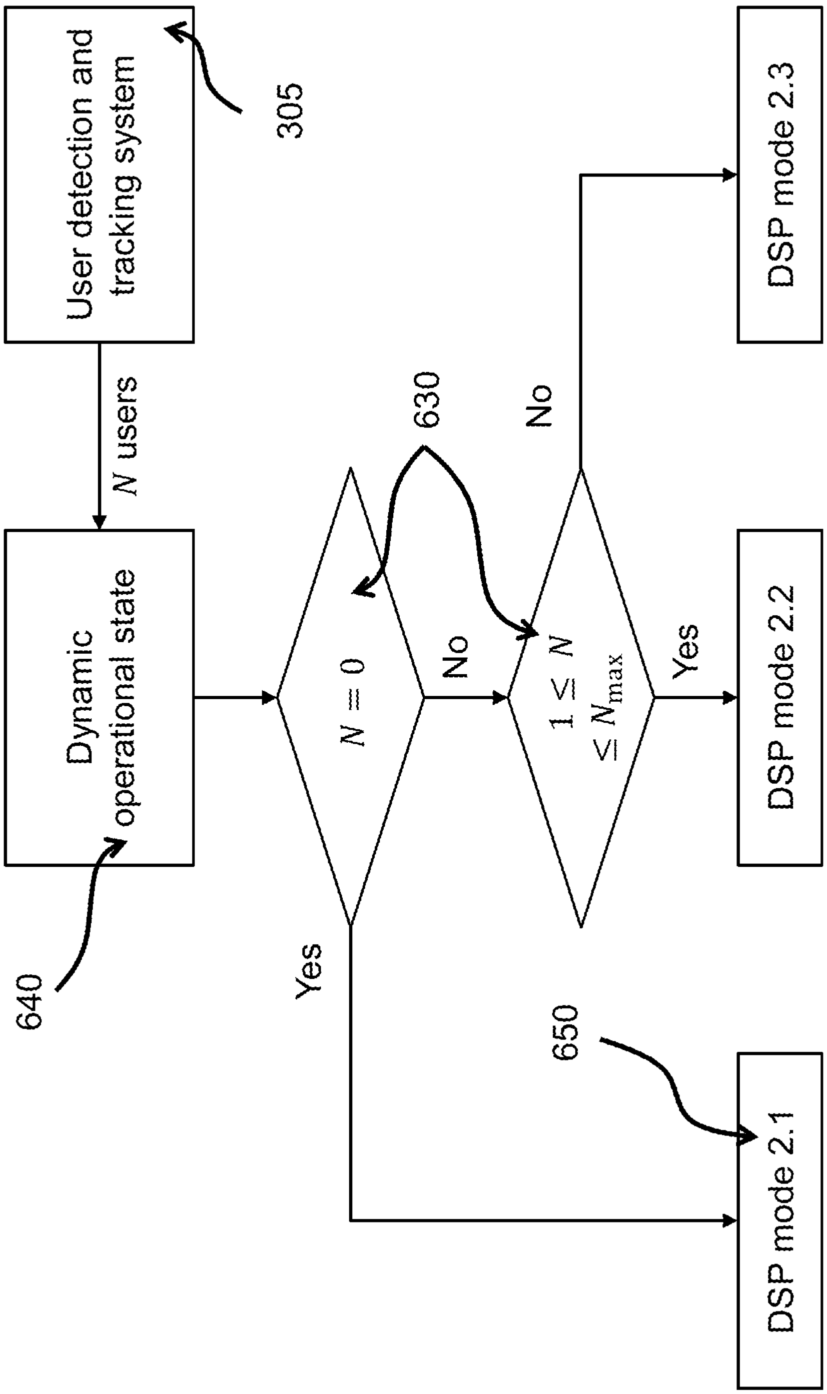
FIG. 6 shows a plurality of DSP modes being assigned to a dynamic operational state, which selects between them based on the number of detected users.
Figure 7:
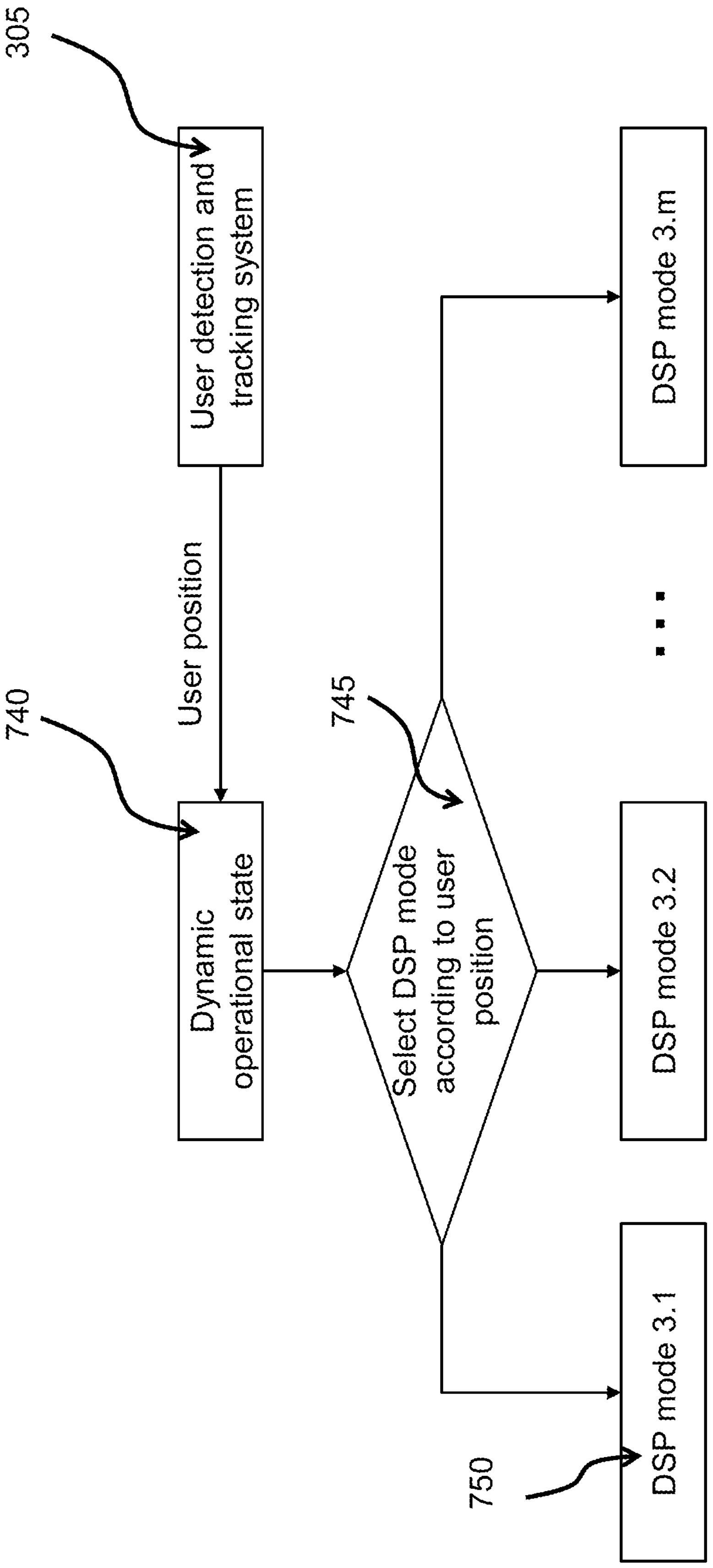
FIG. 7 shows a plurality of DSP modes being assigned to a dynamic operational state, which selects between them based on the position of a single detected user.
Figure 10:
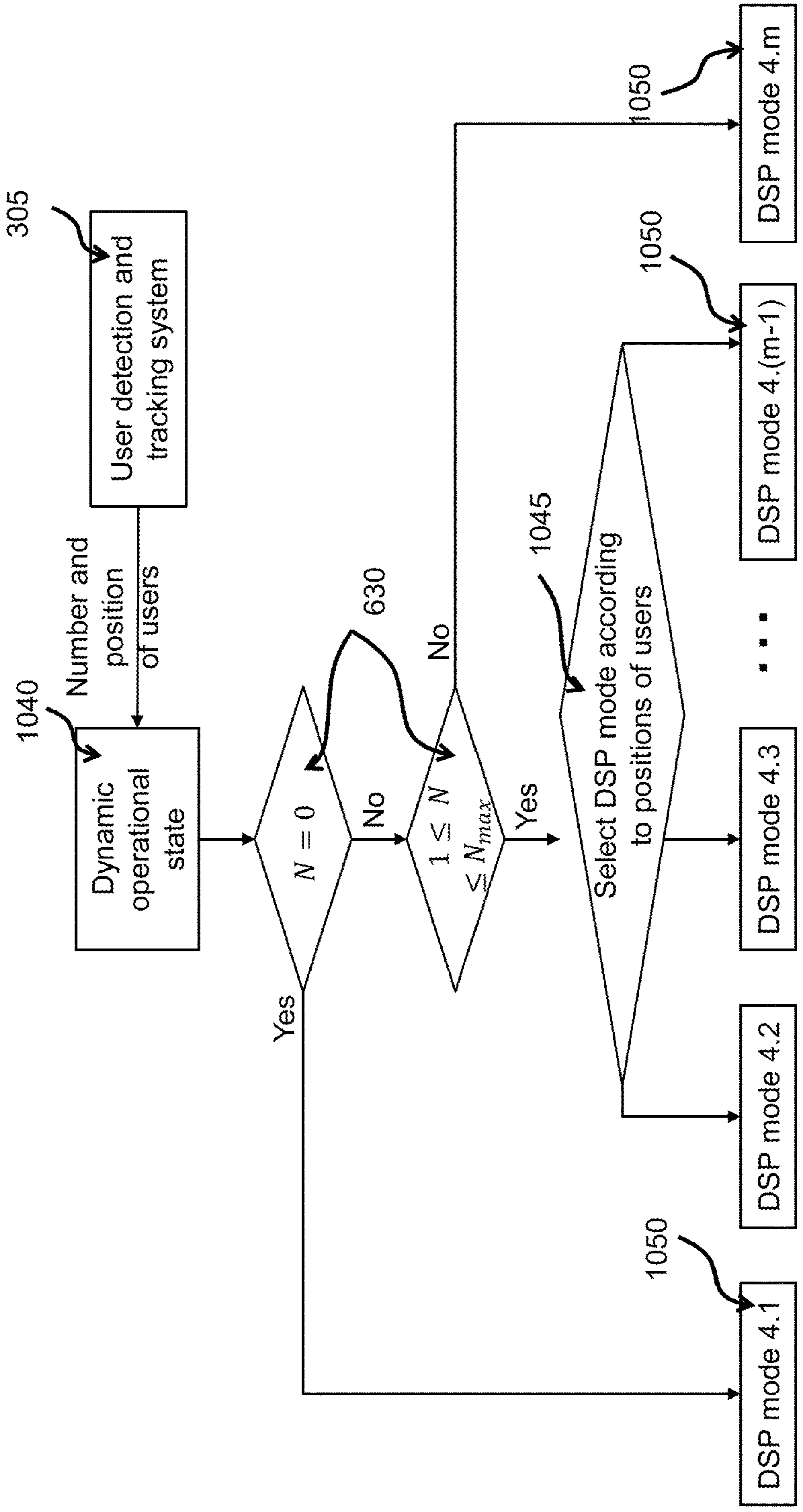
FIG. 10 shows logic governing an operational state that changes DSP mode depending on both the number of detected users and their positions.

As will be described with respect to FIGS. 6, 7, and 10, there are several ways of selecting the sound reproduction mode, some of which may be based only on the number of users, some of which may be based only on the position of the users, and some of which may be based on both the number and the position of the users. It will be understood that, even if not explicitly mentioned, and unless otherwise indicated, any of the approaches described herein may be based on either, or both, of the number and the position of the users.

The set of predetermined sound reproduction modes may comprise one or more user-position-independent modes, and/or one or more user-position-dependent modes. Each of these modes may be particularly suited to particular numbers and/or positions of users, and may be less suited to other numbers and/or positions of users.

At step S130, a set of filters may optionally be determined. In some sound reproduction modes, this set of filters is to be applied to the at least one input signal to obtain the output audio signals for each of the loudspeakers in the array. An example of a way of determining a set of filters H is described below.

Depending on the selected sound reproduction mode, this set of filters may not be required, or may be determined at relatively low computational cost. For example, in at least one sound reproduction mode, each of the output audio signals may correspond to a respective one of the input audio signals. As another example, in at least one sound reproduction mode, the set of filters may comprise, or consist of, a plurality of frequency-independent delay-gain elements; as a result, in those sound reproduction modes, each of the output audio signals may be a respective scaled, delayed version of the same input audio signal.

At step S140, a respective output audio signal for each of the loudspeakers in the array is determined. The output audio signals are generated according to the selected sound reproduction mode. In other words, the output audio signals for a given input audio signal depend on the selected sound reproduction mode. Each output audio signal is based on at least a portion of the at least one input audio signal.

In one example, the respective output audio signal is generated by applying the set of filters to the at least one input audio signal, or to the at least a portion of the at least one input audio signal.

The set of filters may be applied in the frequency domain. In this case, a transform, such as a fast Fourier transform (FFT), is applied to the at least one input audio signal, the filters are applied, and an inverse transform is then applied to obtain the output audio signals.

The set of filters may be applied in the time domain.

At step S150, the output audio signals may optionally be output to the array of loudspeakers.

It will be understood that the determined number of users in the listening environment may be zero, i.e., there are not necessarily any users in the listening environment.

It will also be understood that a position of a user in the listening environment may be a location of that user, and/or an orientation of the user, e.g., an orientation of the user's head.

Steps S100 to S150 may be repeated with another at least one input audio signal. These steps may be repeated in real time and/or periodically.

As steps S100 to S150 are repeated, the set of filters may remain the same, in which case step S130 need not be repeated, or may change. Similarly, if the number of users and/or the position of users is known not to, or is assumed not to, change for a particular amount of time, then steps S110 to S130 need not be repeated for that particular amount of time.

As one example, steps S110, S120 and S130 can be performed once, during an initialisation phase, and need not be repeated thereafter. For example, the positions of the users may be estimated based on a model or input by a user (e.g., via a remote control and/or a graphical user interface) rather than being received from a sensor, and the selection of a reproduction mode of step S120 and/or the determination of the set of filters of step S130 may be pre-computed.

A method of determining a set of filters may be performed using steps S110 to S130. By performing such a method, the set of filters can be pre-computed, for example, when programming a device to perform the method of FIG. 1. Later, the determined set of filters can be used in a method of generating output audio signals by performing steps S100 and S140 to S150. The need to perform steps S110 to S130 in real time can thus be avoided, thereby reducing the computational resources required to implement the method of FIG. 1.

Similarly, if the number and/or position of the users changes over time but it is known, or is assumed, that their movement will be such that the selected sound reproduction mode of step S120 will not change over time (for example, if each of the users is determined to remain within a respective given region of space), then step S120 need not be repeated for that particular amount of time. For example, step S120 can be performed once, during an initialisation phase, and need not be repeated thereafter (unless, for example, it is determined that at least one of the users no longer remains within the respective given region of space).

As would be understood by a skilled person, the steps of FIG. 1 can be performed with respect to successively received frames of a plurality of input audio signals. Accordingly, steps S100 to S150 need not all be completed before they begin to be repeated. For example, in some implementations, step S100 is performed a second time before step S150 has been performed a first time.

Figure 2:
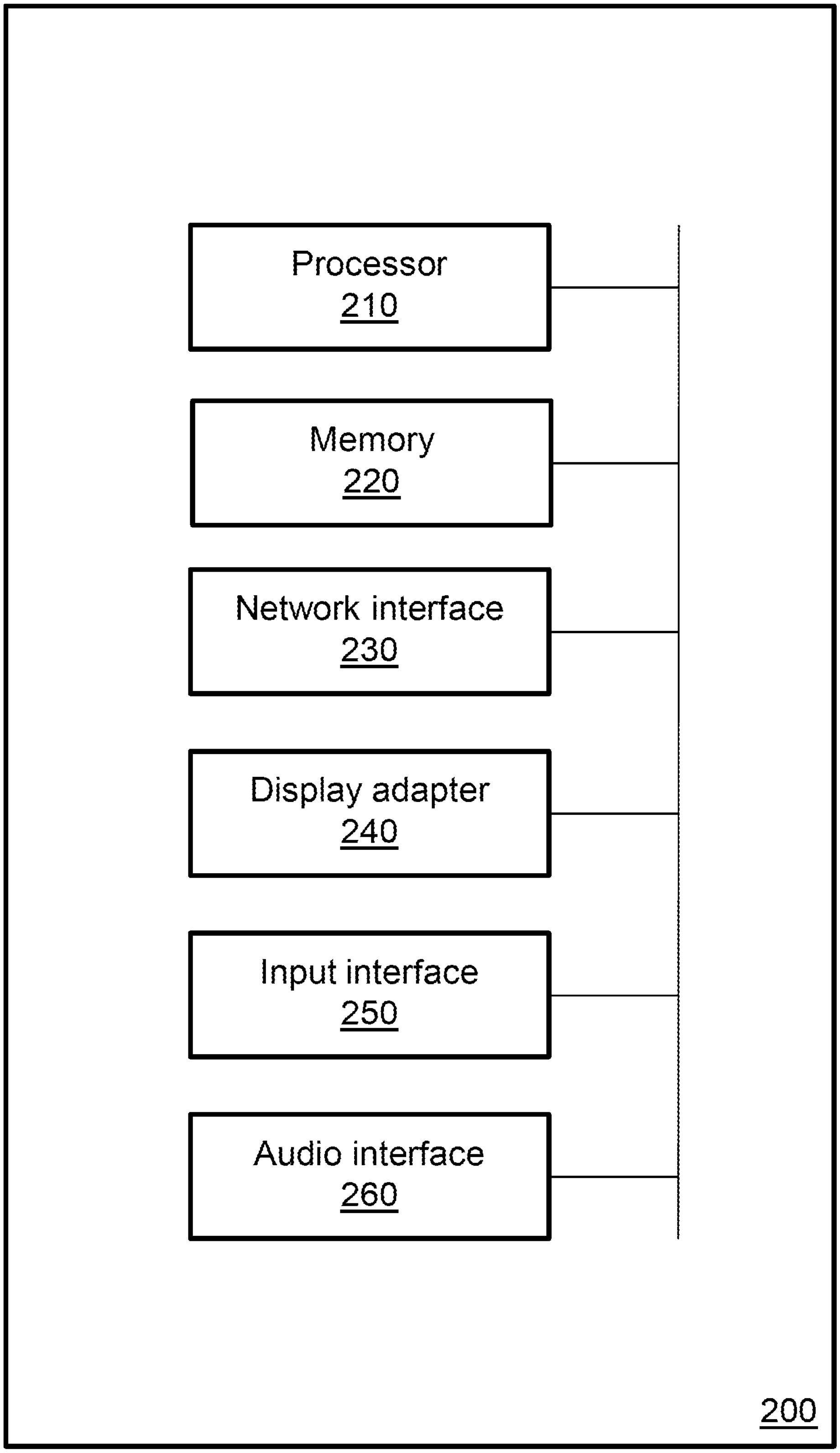
FIG. 2 shows an apparatus for generating audio signals for an array of loudspeakers which can be used to implement the method of FIG. 1.

A block diagram of an exemplary apparatus 200 for implementing any of the methods described herein, such as the method of FIG. 1, is shown in FIG. 2. The apparatus 200 comprises a processor 210 (e.g., a digital signal processor) arranged to execute computer-readable instructions as may be provided to the apparatus 200 via one or more of a memory 220, a network interface 230, or an input interface 250.

The memory 220, for example a random-access memory (RAM), is arranged to be able to retrieve, store, and provide to the processor 210, instructions and data that have been stored in the memory 220. The network interface 230 is arranged to enable the processor 210 to communicate with a communications network, such as the Internet. The input interface 250 is arranged to receive user inputs provided via an input device (not shown) such as a mouse, a keyboard, or a touchscreen. The processor 210 may further be coupled to a display adapter 240, which is in turn coupled to a display device (not shown). The processor 210 may further be coupled to an audio interface 260 which may be used to output audio signals to one or more audio devices, such as a loudspeaker array (or 'array of loudspeakers', or 'sound reproduction device') 300. The audio interface 260 may comprise a digital-to-analog converter (DAC) (not shown), e.g., for use with audio devices with analog input(s).

Although the present disclosure describes some functionality as being provided by specific devices or components, e.g., a sound reproduction device 300 or a user detection-and-tracking system 305, it will be understood that that functionality may be provided by any device or apparatus, such as the apparatus 200.

Various approaches for selecting the sound reproduction mode are now described, along with some context for those approaches.

Field

The present disclosure relates to the field of audio reproduction systems with loudspeakers and audio digital signal processing. More specifically, the present disclosure encompasses a sound reproduction device, e.g., a soundbar, that is connected to a user-detection-and-tracking system that can automatically detect how many users are within the operational range of the device and change the reproduction mode of the device to one of a plurality of modes depending on the number of users that have been detected in the scene and/or on the positions of said users.

For example: the sound reproduction device can reproduce stereo sound when no users are detected within the operating range of the device; it can reproduce sound through a cross-talk-cancellation algorithm or other sound field control method when a number of users below the maximum supported number of users is present within the operating range of the device, and it can reproduce multichannel audio or apply an object-based surround sound algorithm, for example Dolby Atmos or Dolby True HD, when the number of detected users exceeds the maximum number of users supported by other methods.

Issues

The present disclosure addresses an issue that some sound field control audio reproduction devices have when they need to provide various reproduction modes according to the number of users present within the operational range of the sound reproduction device, or according to the relative position of the users with respect to the sound reproduction device, or their relative positions with respect to one another.

Certain sound field control algorithms, for example, cross-talk cancellation or sound zoning, typically give excellent sound quality and an immersive listening experience for the number of users they are designed to work with. However, they provide a mediocre listening experience to any additional users. This can be an issue in multi-user scenarios, where it is desired to provide a homogeneous listening experience for a plurality of users.

In order to mitigate this issue, the present disclosure describes a system in which the digital signal processing (DSP) performed by a sound reproduction device can be adjusted automatically in real-time depending on the number of users within the operational range of the device, and/or depending on the position of users. In this way, a sound reproduction device can adapt in real-time and provide the best sound experience at any point in time according to the number of users within the operational range of the device, and/or the positions of said users.

Alternative Approaches to the Present Approaches

The present approaches can automatically change their reproduction mode depending on the detected number and/or position of users. Other spatial audio reproduction systems could change reproduction modes with a remote control device, or by the use of an external application. In contrast, the present approaches may employ a computer vision device, or any other user detection-and-tracking system to control the DSP scheme employed by the sound reproduction device.

Other sound reproduction devices could detect if a user is in proximity of the device and turn on/off in response, or use cameras in an audio-visual system to control content consumption. In contrast, the present approaches are for controlling the audio reproduction dynamics.

Details of Present Approaches

The present approaches involve a sound reproduction device 300 that is connected (or 'communicatively coupled') to a user detection-and-tracking system 305. The user detection-and-tracking system can provide positional information of a plurality of users 310 within the operational range 315 of the sound reproduction device 300. The positional information may be based on the centre of each user's head and/or the location of each user's ears and may also include information about the users' head orientation. The user detection-and-tracking system can also provide information regarding the total number of users within the operational range 315 of the sound reproduction device.

The sound reproduction device has a processor system to carry out logic operations and implement different digital signal processing algorithms. The processor is capable of storing and reproducing a plurality of operational states 340 which can be selected at any time by user commands 325. User commands may be issued by the user via, for example, a hardware button on the device, a remote control device or a companion application running on another device. Each operational state can be assigned either one or a plurality of DSP modes 350. The DSP modes and the operational states can vary in real-time according to the user information 330 provided by the user detection-and-tracking device.

Figure 3:
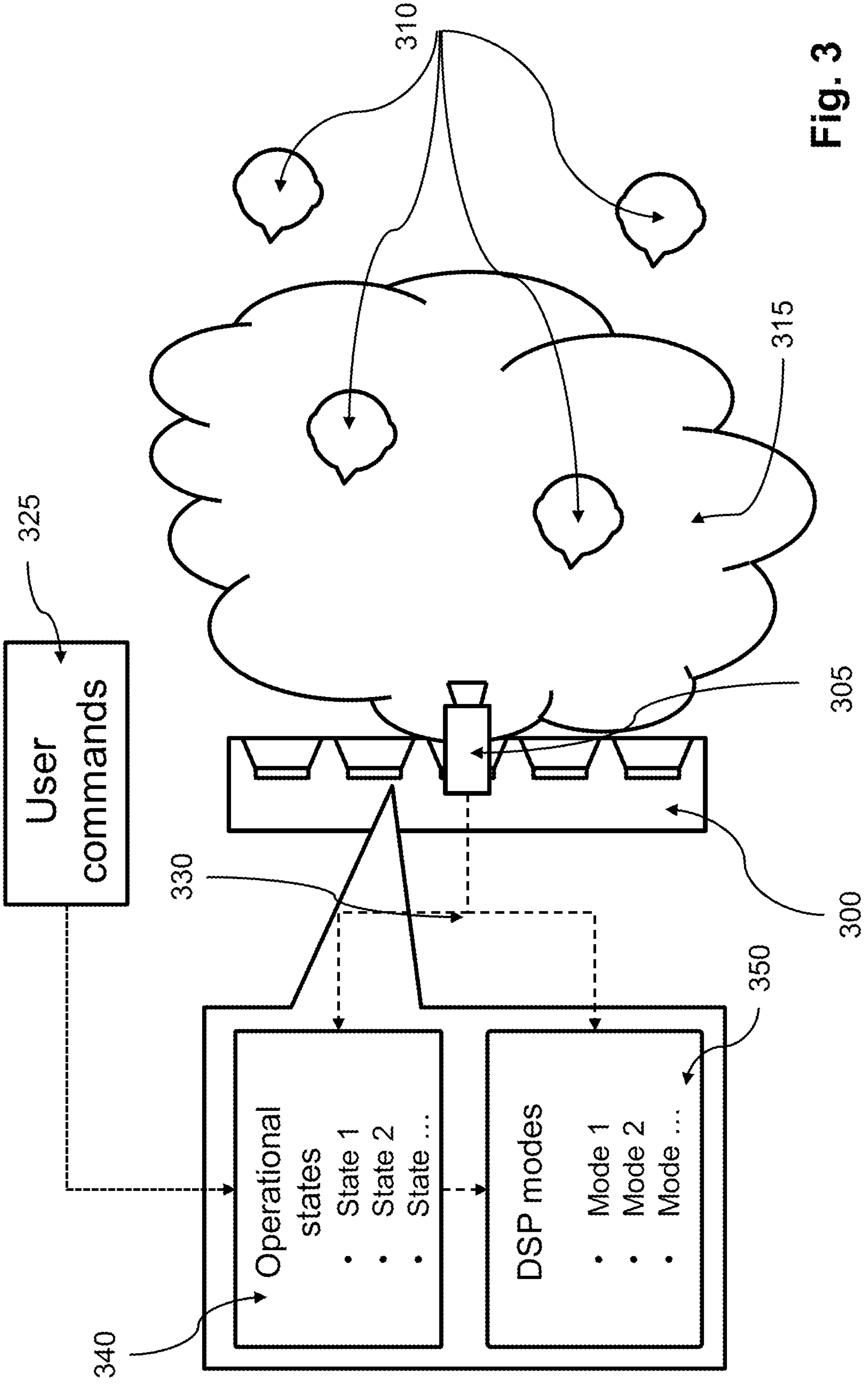
FIG. 3 shows elements of a sound reproduction device defined in the present approach.

An example of such a system is depicted in FIG. 3.

DSP Modes

It is possible for a sound reproduction device equipped with appropriate DSP hardware and software to decode a plurality of audio input formats and reproduce a plurality of different audio effects. Usage of a combination of DSP hardware and software to perform such audio input format decoding and/or signal processing in order to achieve a given audio effect for one or more users is referred to as a "DSP mode". It is possible for a plurality of DSP modes to be implemented within a sound reproduction device.

A DSP mode can be used, for example, to decode a legacy immersive surround sound or object-based audio format, such as Dolby Atmos, DTS-X or any other audio format, and then generate signals appropriate for output by the loudspeakers that form part of the sound reproduction device.

A further example of a DSP mode is a matrixing operation that can arbitrarily route channels of a multichannel audio input format to the output loudspeaker channels of the sound reproduction device. For example, in the case of a linear loudspeaker array, the centre channel in a surround sound input format could be routed through the central loudspeaker or loudspeakers in the array; input audio channels corresponding to the left side of the azimuthal plane (e.g., "Left", "Left Surround", "Left Side") could be assigned to the leftmost loudspeaker array channel; and input audio channels corresponding to the right side of the azimuthal plane, e.g., "Right", "Right Surround", "Right Side", could be assigned to the rightmost loudspeaker array channel.

Another example of a DSP mode is an algorithm for the creation of virtual headphones at the ears of either one or a plurality of users through a cross-talk cancellation algorithm, which can be used to reproduce 3D sound. To allow for this mode to be implemented, an adaptive cross-talk cancellation algorithm of the likes of the ones described in International Patent Application No. PCT/GB2017/050687 or European Patent Application No. 21177505.1 could be employed.

Another example of a DSP mode is the creation of superdirective beams that are directly targeted to a user or a plurality of users, for the delivery of tailored audio signals. Such a beamforming operation could enable personal audio reproduction, the provision of private listening zones, to increase audibility in hard of hearing users. To this end, an algorithm of the likes of the ones described in International Patent Application No. PCT/GB2017/050687 or B. D. V. Veen and K. M. Buckley, "Beamforming: A versatile approach to spatial filtering", IEEE ASSP Mag., no. 5, pp. 4-24, 1988 could be used.

A distinct DSP mode could be used to form superdirective beams that are targeted towards acoustically reflective surfaces in the environment in which the sound reproduction device is situated. Such a technique could be used to provide a surround-sound effect when appropriate channels of a multichannel audio input format are routed to each of these superdirective beams.

The information provided by a user detection-and-tracking system to the sound reproduction device can enable individual DSP modes to change their behavior depending on the number of users detected within the operating range of the sound reproduction device and/or the position of the user or users with respect to the sound reproduction device. Additionally, this information can be used to automatically select an appropriate DSP mode, for example, if the currently selected DSP mode is incompatible with the incoming audio input format or inappropriate for the number of users detected within the operating range of the sound reproduction device. The control logic that governs which DSP mode is selected at a given time depends on the operational state of the sound reproduction device; this is described in the following subsection.

Operational States

Figure 4:
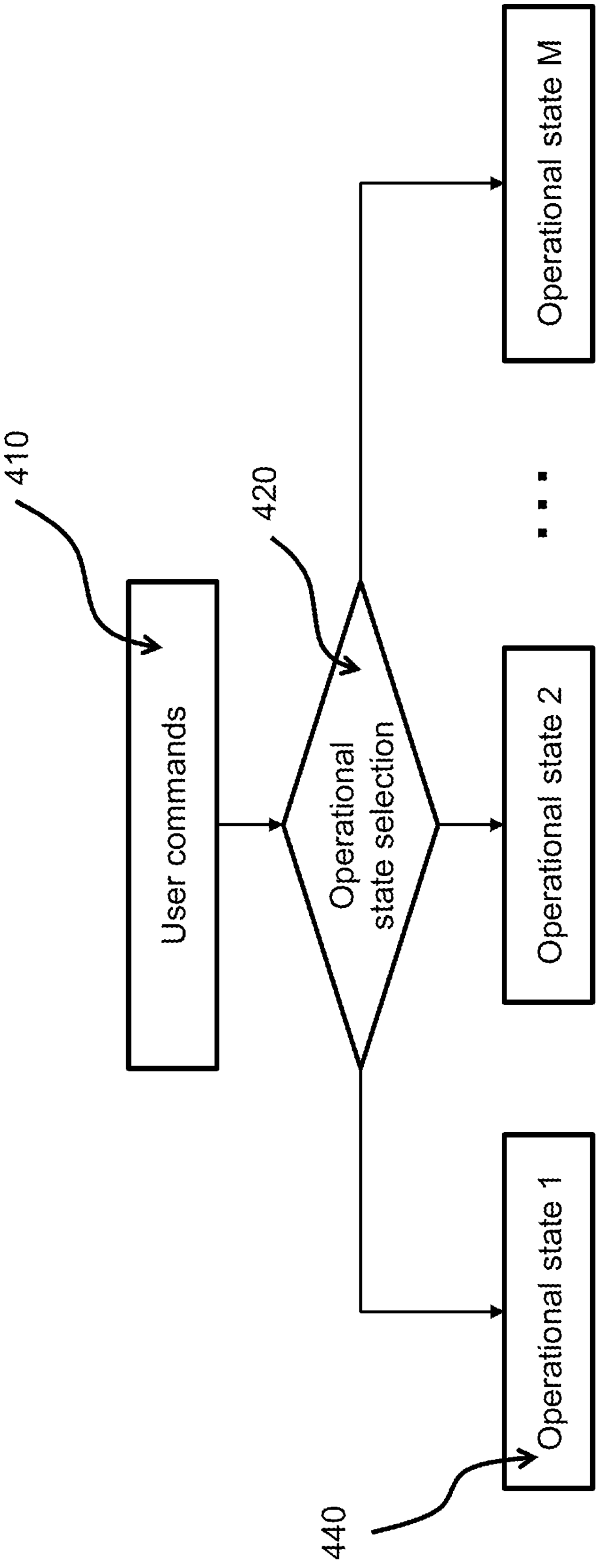
FIG. 4 shows logic governing the selection of operational states within the sound reproduction device.

A plurality of operational states 440 can exist within the sound reproduction device. These operational states can be user-selectable, as shown in FIG. 4, and therefore it is possible for a user to select one of these states at a time based on their preference by sending appropriate user commands 410 to operational state selection logic 420. These operational states can be used to force the system to use a particular DSP mode, or to allow the system to adapt to changes in the number of users, their position relative to the speaker array and/or their position relative to each other by selecting from a plurality of implemented (or 'predetermined') DSP modes. There need not, however, be a plurality of operational states, or the sound reproduction device may remain in a particular operational state, and therefore the selection of an operational state is optional.

Figure 5:
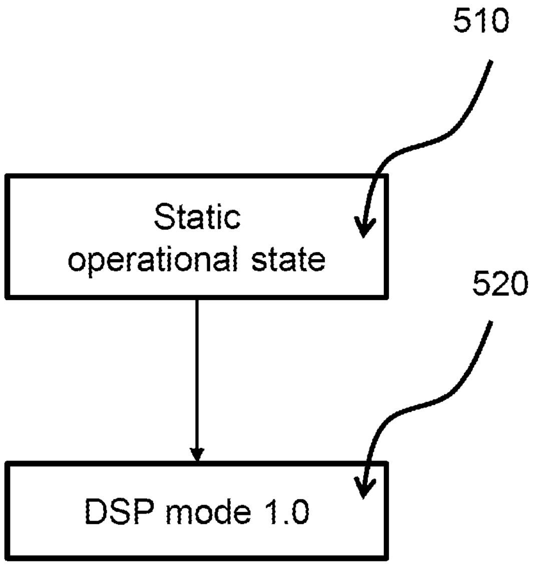
FIG. 5 shows a single DSP mode associated with a static operational state.

The plurality of implemented DSP modes can be assigned to a plurality of operational states. The operational states can either be "static" or "dynamic". A static operational state 510 will have a single DSP mode 520 assigned to itself. Example static operational states may include a "room fill mode" or a cross-talk-cancellation "CTC" mode that remains active regardless of the information from the user detection-and-tracking system. The assignment of a single DSP mode to a static operational state is depicted in FIG. 5.

In a "dynamic" operational state, the assigned DSP mode can change depending on information provided by the user detection-and-tracking system, optionally in real-time. The dynamic operational states can function differently depending on the type of information that is provided by the user detection-and-tracking system.

In one example of the disclosure, in a dynamic operational state 640, the sound reproduction device 300 can change the DSP mode based on the number of users detected by the user detection-and-tracking system 305 within the operational range of the sound reproduction device 300. An example of the logic governing such a dynamic operational state is shown in FIG. 6. This logic analyses the information provided by the user detection-and-tracking system 305 regarding the number of detected users 630 and assigns an appropriate DSP mode 650, optionally in real-time. An example of the utilisation of such a dynamic operational state is to change the DSP mode of a sound reproduction device when a maximum number of users, $N_{max}$, is exceeded and the device cannot render 3D sound through a sound field control algorithm to all the detected users. In this case, the dynamic operational state will transition to another DSP mode which can produce a more homogeneous listening experience to all the detected users.

In an additional example of the disclosure, in the dynamic operational state 740, the sound reproduction device 300 can select from a plurality of DSP modes 750 depending on the position of a user with respect to the sound reproduction device 300. In this case, a plurality of spatial regions 880 are defined and each is associated with a DSP mode. As the user moves between the regions, the user position dependent logic 745 may cause the sound reproduction device to transition between DSP modes. This is useful for DSP algorithms that are only capable of providing a given audio effect within a particular spatial region, due to physical or acoustical limitations. An example of the logic governing this operational state is shown in FIG. 7. The spatial regions can be defined differently for each operational state and may include different areas, distances and angular spans. An example of these regions is shown in FIG. 8.

Figure 9A:
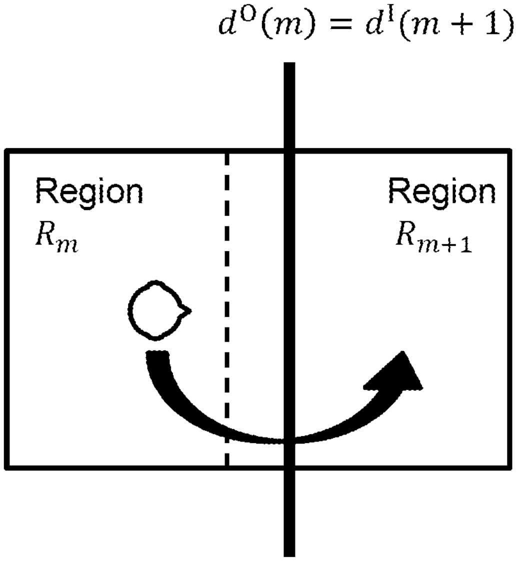
FIGS. 9*a* and 9*b* show that, to trigger a change in the DSP mode associated with a given spatial region $R_m$, a user should cross the outer boundary of the region, $d^O(m)$.
Figure 9B:
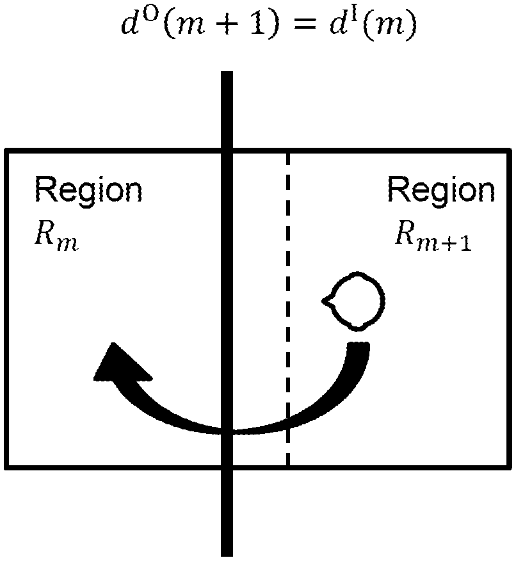
Figure 8:
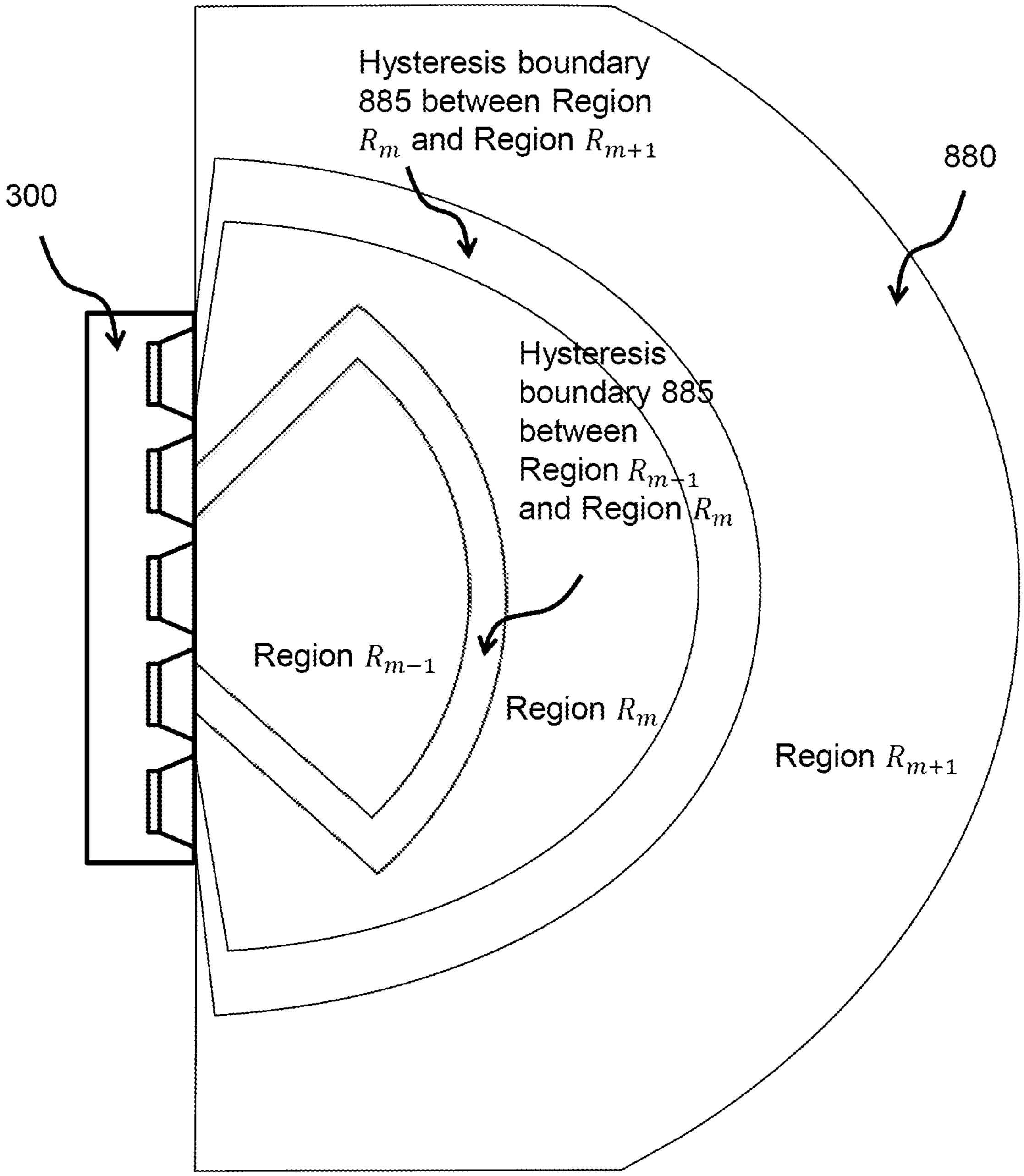
FIG. 8 shows a user moving between spatial regions and transitioning through a hysteresis boundary to trigger a change in DSP mode.

To manage the position-dependent switching between DSP modes, a hysteresis mechanism may be employed, see FIG. 8. This mechanism introduces hysteresis boundaries 885 between spatial regions to prevent the sound reproduction device from transitioning between two DSP modes when the user is located at the edge between two adjacent regions. A detailed example is shown in FIGS. **9*a* and 9*b*. When a user is located in a spatial region $R_m$, a given DSP mode m is selected. If the user moves outside of the outer region boundary $d^O(m)$, the selected DSP mode will transition from DSP mode m to DSP mode m+1, as shown in FIG. 9*a*. In order for the system to transition back to DSP mode m, the user should pass through the outer boundary of region $R_{m+1}$, i.e., $d^O(m+1)$, which is coincident with the inner boundary of region $R_m$, i.e., $d^1(m)$, as shown in FIG. 9*b***.

In another example of the disclosure, the DSP mode selected in a given dynamic operational state depends on both the total number of detected users 630 and on the relative position of the detected users with respect to the sound reproduction device 300. An example of the control logic governing such a dynamic operational state is shown in FIG. 10. The user detection-and-tracking device 305 provides information to the dynamic operational state 1040 which has a logical unit capable of taking decisions based on the number of users and another logical unit that takes decisions based on the relative positions of the users 1045, allowing the sound reproduction device to transition between different DSP modes 1050 accordingly.

Figure 11:
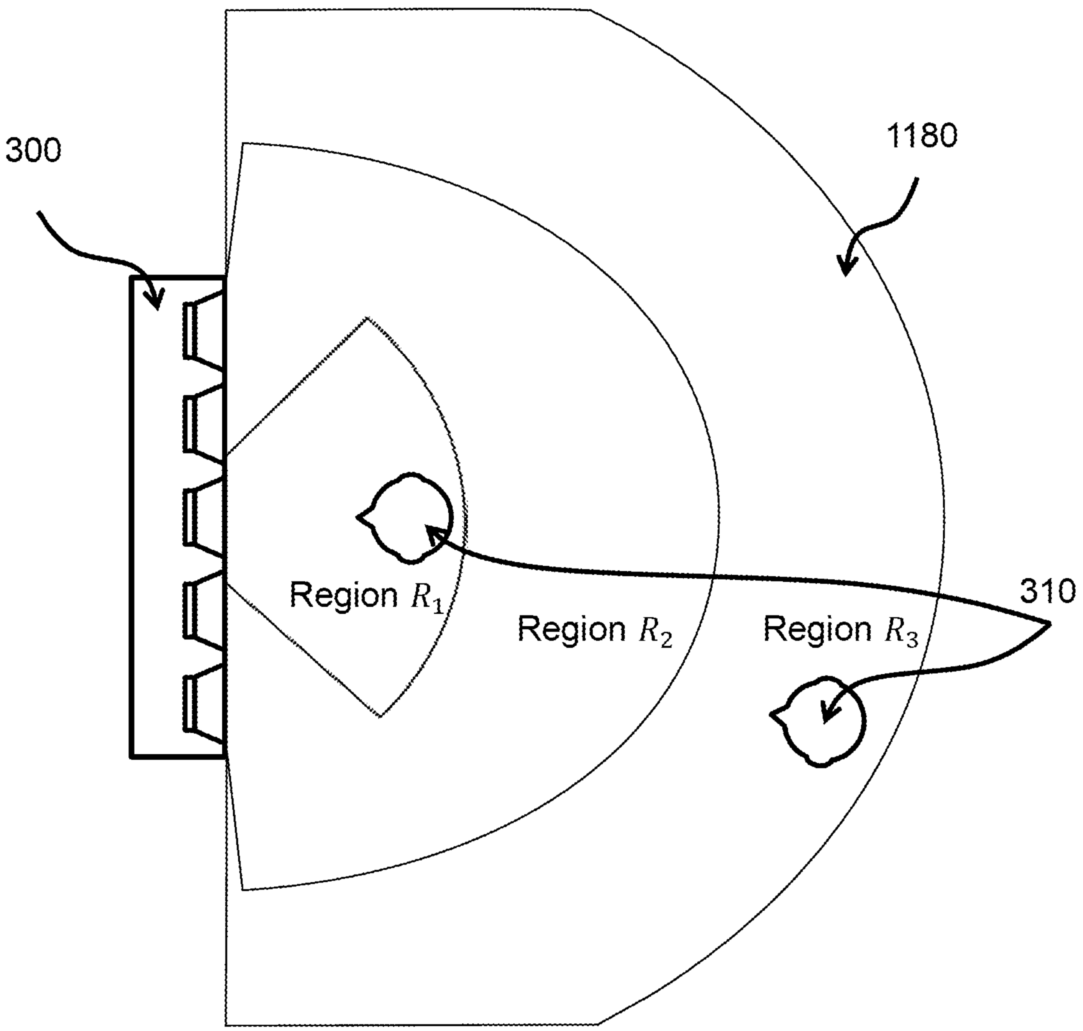
FIG. 11 shows that an operational state may be configured to use one DSP mode when a user is situated in a particular region until another user is detected in the same or another region.

An example of how such a dynamic state can be utilised is when a number of users, below the maximum supported number of users for a given DSP mode, is detected by the user detection-and-tracking system 305 within a given spatial region or regions. If, at a later point in time, an additional user or additional users are detected by the user detection-and-tracking system in the same or other regions 1180, the logic governing the dynamic operational state may transition to another DSP mode. FIG. 11 illustrates this behavior.

A further example of how such a dynamic state can be utilised is when a plurality of users are situated very close to one another. This can cause audible artefacts when some DSP algorithms are used, and it may be beneficial to transition to a more appropriate DSP mode to avoid these artefacts.

System Implementation

To understand how some of the DSP modes of these examples could be implemented, consider a loudspeaker array that can be configured to perform various tasks, i.e., CTC or creation of beams at different positions to generate a diffuse field over an environment, which is also known as "room-fill mode".

Figure 12:
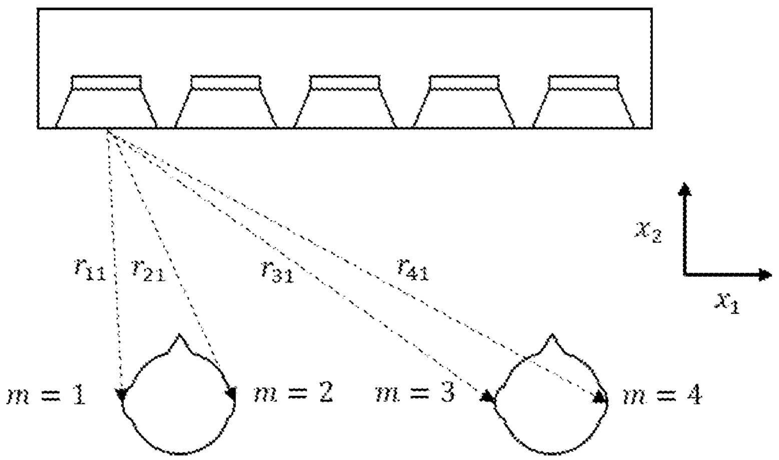
FIG. 12 shows a control geometry for an array of L speakers and four acoustic control points $x_1$ to $x_m$ with M=4, which correspond, in this case, to the ears of two listeners.

Consider a system with a reference geometry as shown in FIG. 12. The spatial coordinates of the loudspeakers are $y_1, \ldots, y_L$, whereas the coordinates of the M control points are $x_1, \ldots, x_M$. The matrix S(ω), hereafter referred to as plant matrix, whose element $S_{m,l}(\omega)$ is the electro-acoustical transfer function between the l-th loudspeaker and the m-th control point, expressed as a function of the angular frequency ω. The reproduced sound pressure signals at the M control points, $p(\omega)=[p_1(\omega), \ldots, p_M(\omega)]^T$, for a given frequency ω are given by p(ω)=S(ω)q(ω), where q(ω) is a vector whose L elements are the loudspeaker signals. These are given by q(ω)=H(ω)d(ω), where d(ω) is a vector whose M elements are the M signals intended to be delivered to the various control points. H(ω) is a complex-valued matrix that represents the effect of the signal processing apparatus, succinctly referred to herein as "filters". It should be clear though that each element of H(ω) is not necessarily a single filter, but can be the result of a combination of filters, delays, and other signal processing blocks.

In what follows, the dependency of variables on the frequency ω will be dropped to simplify the notation. We have therefore that $$p=SHd \tag{1}$$

Figure 13:
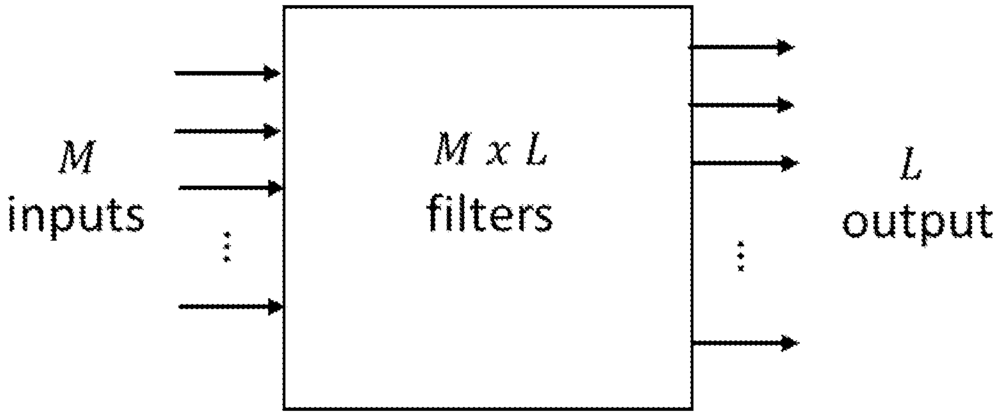
FIG. 13 shows a block diagram for implementing a set of filters used in some of the DSP modes.

An approach to design the filters is to compute H as the (regularised) inverse or pseudo-inverse of matrix S, or of a model of matrix S, that is $$H=e^{-j\omega T}G^H(GG^H+A)^{-1} \tag{2}$$

where matrix G is a model or estimate of the plant matrix S, A is a regularisation matrix (for example for Tikhonov regularisation), $[\bullet]^H$ is the complex-transposed (Hermitian) operator, $j=\sqrt{-1}$, and T is a modelling delay. A straightforward implementation of this expression leads to a signal flow as using bank of M×L filters, as shown in the block diagram of FIG. 13.

The filters could be made time-adaptive and modified in real time to adjust the control points to the user's position. Alternatively, other signal processing schemes like the ones described in International Patent Application No. PCT/GB2017/050687 or B. D. V. Veen and K. M. Buckley, "Beamforming: A versatile approach to spatial filtering", IEEE ASSP Mag., no. 5, pp. 4-24, 1988 could be employed.

Figure 14:
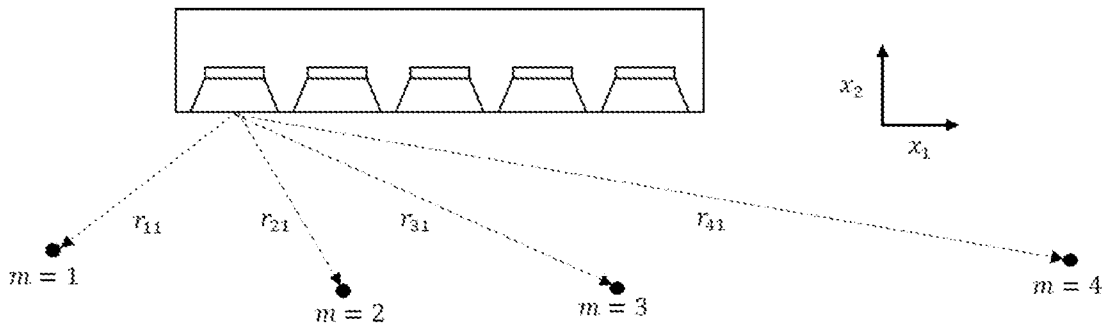
FIG. 14 shows a control geometry for four acoustic control points $x_1$ to $x_M$ with M=4, which are positioned so as to spread the sound spatially.

Alternatively, the control points of FIG. 12 could be rearranged to be placed at certain spatial positions so that these are used to create beams of sound at different directions, as illustrated in FIG. 14. These beams can be used to radiate audio in a certain direction in order to spread the sound spatially and to minimize radiation in another direction, to minimize the influence of a given channel in a given position, i.e., the position of a user. This is, for example, a use-case when it is desired to excite reflections coming from the walls on a room, in order for example to create a virtual surround system by exciting the reflections of a room's wall.

EXAMPLES OF THE PRESENT DISCLOSURE

Examples of the present disclosure are set out in the following numbered items.

1. A sound reproduction device comprising;

a plurality of loudspeakers for emitting audio signals;

and a user detection-and-tracking system;

wherein said user detection-and-tracking system is configured to assess the number of users within the operational range of the sound reproduction device and the locations of said users;

and wherein said user detection-and-tracking system is used to alter the digital signal processing performed by the sound reproduction device, so that the sound reproduction device operates differently if there is a change in the number of users that are detected within the operational range of the sound reproduction device, or if a change is detected in the position of any of the users with respect to the sound reproduction device, or if a change is detected in the position of any of the users with respect to any of the other users.

2. The sound reproduction device of item 1 where a plurality of DSP algorithms and/or associated hardware components are organised into a plurality of DSP modes.

3. The sound reproduction device of item 1 where a plurality of user-configurable operational states are available.

4. The sound reproduction device of item 1 where it is possible to assign either one or a plurality of DSP modes to each user-configurable operational state.

5. The sound reproduction device of item 1 where the user detection-and-tracking system is employed to count and locate users within the operational range of the device.

6. The sound reproduction device of item 4 where the behavior of a given DSP mode can change in response to information from the user detection-and-tracking system.

7. The sound reproduction device of item 4 where the selected DSP mode can change depending on information from the user detection-and-tracking system.

8. The sound reproduction device of item 7 where the selected DSP mode can change depending on the positions of the detected users with respect to an established set of spatial regions.

9. The sound reproduction device of item 8 where the logic that governs the selection of a DSP mode based on the positions of the detected users has hysteresis regions on the boundaries of the spatial regions, wherein the hysteresis regions have inner and outer limits.

10. The sound reproduction device of item 1 where if one, or another established number of users are detected within the operational range of the sound reproduction device, the sound reproduction device operates by providing 3D sound to the users through cross-talk cancellation (CTC).

11. The sound reproduction device of item 10 where the loudspeaker output is adjusted in real-time based on information from the user detection-and-tracking system to provide position-adaptive 3D sound to either one or an established number of users.

12. The sound reproduction device of item 1 where if one, or another established number of users are detected within the operational range of the sound reproduction device, the sound reproduction device operates by providing a personal listening zone for each user.

13. The sound reproduction device of item 12 where the loudspeaker output is adjusted in real-time based on information from the user detection-and-tracking system to provide position-adaptive personal audio for either one or an established number of users.

14. A computer program comprising instructions which, when executed by a processing system, cause the processing system to perform the method of any of items 1 to 13, or a computer-readable medium comprising instructions which, when executed by a processing system, cause the processing system to perform the method of any of items 1 to 13, or a data carrier signal comprising instructions which, when executed by a processing system, cause the processing system to perform the method of any of items 1 to 13.

Alternative Implementations of the Present Approaches

It will be appreciated that the above approaches can be implemented in many ways. There follows a general description of features which are common to many implementations of the above approaches. It will of course be understood that, unless indicated otherwise, any of the features of the above approaches may be combined with any of the common features listed below.

There is provided a computer-implemented method.

The method may be a method of generating audio signals for an array of loudspeakers (e.g., a line array of L loudspeakers).

The array of loudspeakers may be positioned in a listening environment (or 'acoustic space', or 'acoustic environment').

The method may comprise receiving at least one input audio signal [e.g., d].

Each of the at least one input audio signals may be different.

At least one of the at least one input audio signals may be different from at least one other one of the at least one input audio signals.

The method may comprise determining (or 'estimating') at least one of:

a number of users in the listening environment, or a respective position of each of one or more users in the listening environment.

The method may comprise selecting a sound reproduction mode from a set of predetermined sound reproduction modes of the array of loudspeakers. The selecting may be based on the at least one of the number of users or the respective position of each of the one or more users in the listening environment.

The method may comprise generating (or 'determining') a respective output audio signal [e.g., Hd or q] for each of the loudspeakers in the array of loudspeakers based on at least a portion of the at least one input audio signal. The output audio signals may be generated according to the selected sound reproduction mode.

The determining may comprise determining the number of users in the listening environment. Such a scenario is illustrated, for example, in FIGS. 6 and 10.

Each of the sound reproduction modes may be associated with a number, or a range of numbers, of users. The selected sound reproduction mode may be selected from the one or more predetermined sound reproduction modes associated with the determined number of users.

The determining may comprise determining the number of users in a predetermined region of the listening environment or within a predetermined range of the array of loudspeakers.

The determining may comprise determining the respective position of each of the one or more users in the listening environment. Such a scenario is illustrated, for example, in FIGS. 7 and 10.

The respective position of a user may be a location of the user in the listening environment, and/or an orientation of the user in the listening environment.

Each of the predetermined sound reproduction modes may be associated with a respective one of a plurality of predetermined regions. The selected sound reproduction mode may be associated with one of the plurality of predetermined regions in which at least one of the one or more users is positioned.

The selecting may comprise determining in which of a plurality of predetermined regions each of the one or more users is positioned. The selected sound reproduction mode may be selected based on the respective predetermined region in which each of the one or more users is positioned.

The selecting may comprise determining a number of users positioned in a predetermined region of the listening environment or within a predetermined range of the array of loudspeakers. This determining may be based on the respective position of each of the one or more users in the listening environment. The selected sound reproduction mode may be selected based on the number of users in the predetermined region of the listening environment or within the predetermined range of the array of loudspeakers.

The selected sound reproduction mode may be a first sound reproduction mode. The method may further comprise, responsive to determining that the position of at least one of the one or more users is outside an outer boundary of a first predetermined region associated with the first sound reproduction mode, selecting a second sound reproduction mode and repeating the generating according to the selected second sound reproduction mode. The method may further comprise, responsive to determining that the position of at least one of the one or more users is within an inner boundary of the first predetermined region, selecting the first sound reproduction mode and repeating the generating according to the selected first sound reproduction mode.

The first and second sound reproduction modes may be different.

The first and second predetermined regions may be distinct, partially overlapping regions.

The first and second predetermined regions may be adjacent.

The respective position of each of the one or more users may be a position of the one or more users with respect to the array of loudspeakers.

The one or more users in the listening environment may comprise a plurality of users, and the position of one of the plurality of users may be a position of the one of the plurality of users with respect to another one of the plurality of users.

At least one parameter of the selected sound reproduction mode may be set based on at least one of the number of users or the respective position of each of the one or more users in the listening environment.

The determining of the number and/or position of the users may be based on a signal captured by a sensor and/or a user-detection-and-tracking system.

The users in the listening environment may be users within a detectable range of the sensor. The predetermined range may be the detectable range of the sensor, in which case the determining may not need to be specifically limited to the predetermined range, or may be a smaller range, in which case the determining may need to be specifically limited to the predetermined range.

The determining may be based on a signal captured by an image sensor.

The determining may be based on a plurality of signals received from a corresponding plurality of image sensors.

The image sensor, or each of the plurality of image sensors, may be a visible light sensor (i.e., a conventional, or non-infrared sensor), an infrared sensor, an ultrasonic sensor, an extremely high frequency (EHF) sensor (or 'mmWave sensor'), or a LiDAR sensor.

The determining may be at a first time and the selecting may be at a second time. The method may further comprise:

at a third time, determining at least one of the number of users in the listening environment and the respective position of each of the one or more users in the listening environment;

at a fourth time, repeating the selecting based on the at least one of the number of users or the respective position of each of the one or more users in the listening environment at the third time; and repeating the generating based on the selecting at the fourth time.

The third time may be a given time period after the first time and the fourth time may be the given period after the second time. The given time period may be based on a sampling frequency of an (or the) image sensor.

The at least one input audio signal may comprise a multichannel audio signal.

The multichannel audio signal may be a stereo signal.

The multichannel audio signal may comprise at least one height channel.

The at least one input audio signal may comprise a spatial audio signal.

The at least one input audio signal may comprise an object-based spatial audio signal.

The at least one input audio signal may comprise a lossless audio signal.

The at least one input audio signal may comprise a plurality of input audio signals.

The plurality of input audio signals may comprise a first input audio signal and a second input audio signal, and the second input audio signal may be an equalised version of the first input audio signal.

The output audio signal for a particular loudspeaker may be based on each of the plurality of input audio signals.

The set of predetermined sound reproduction modes may comprise at least one of:

one or more user-position-independent modes; or one or more user-position-dependent modes.

The one or more user-position-independent modes may comprise at least one of:

a stereo mode;

a surround sound mode; or a matrixing mode.

The set of predetermined sound reproduction modes may comprise at least one of:

a stereo mode;

a surround sound mode; or a matrixing mode.

The at least one input audio signal may comprise a plurality of input audio signals and, when the selected sound reproduction mode is one of the one or more user-position-dependent modes, a respective one of the plurality of input audio signals may be to be reproduced, by the array of loudspeakers, at each of a plurality of control points (or 'listening positions') [e.g., $x_1, \ldots, x_M \in \mathbb{R}^3$] in the listening environment.

The at least one input audio signal may comprise a plurality of input audio signals and, when the selected sound reproduction mode is one of the one or more user-position-dependent modes, the output audio signals may be generated to cause a respective one of the plurality of input audio signals to be reproduced at each of a plurality of control points in the listening environment when the output audio signals are output to the array of loudspeakers.

A respective one of the plurality of input audio signals may be to be reproduced, by the array of loudspeakers, at each of a plurality of control points [e.g., $x_1, \ldots, x_M \in \mathbb{R}^3$] in the listening environment.

The plurality of control points [e.g., $x_1, \ldots, x_M \in \mathbb{R}^3$] may be positioned at the positions of the users.

The position of a particular user may be a position of a centre of a head of the particular user.

The plurality of control points [e.g., $x_1, \ldots, x_M \in \mathbb{R}^3$] may be positioned at ears of the users.

The one or more user-position-dependent modes may comprise at least one of:

a personal audio mode in which the plurality of control points are positioned at the positions of the users; or a binaural mode in which the plurality of control points are positioned at ears of the users.

The set of predetermined sound reproduction modes may comprise at least one of:

a personal audio mode in which the plurality of control points are positioned at the positions of the users; or a binaural mode in which the plurality of control points are positioned at ears of the users.

The determined number of users at the first time may be a first determined number of users and the determined number of users at the third time may be a second determined number of users. The second determined number of users may be higher than the first determined number of users, and the selected sound reproduction mode at the second time may be one of the one or more user-position-dependent modes and the selected sound reproduction mode at the fourth time may be one of the one or more user-position-independent modes. In other words, one of the one or more user-position-independent modes may be associated with a higher number of users than one of the one or more user-position-dependent modes.

One of the one or more user-position-dependent modes may be associated with a lower number of users than one of the one or more user-position-independent modes, or one of the one or more user-position-dependent modes may be associated with a range of users having an upper end that is lower than that of a range of users associated with one of the one or more user-position-independent modes.

The stereo mode may be associated with zero users. The one or more user-position-dependent modes may each be associated with a respective number of users higher than zero or with a respective range of users having a lower end higher than zero. The surround sound mode may be associated with a number of users that is higher than the respective number of users, or an upper end of each of the respective ranges of users, associated with each of the one or more user-position-dependent modes or with a range of users having a lower end that is higher than the respective number of users, or an upper end of each of the respective ranges of users, associated with each of the one or more user-position-dependent modes.

One of the one or more user-position-dependent modes may be associated with a predetermined region which is closer to the array of loudspeakers than another predetermined region associated with one of the one or more user-position-independent modes.

The array of loudspeakers may enclose a first predetermined region. One of the one or more user-position-dependent modes may be associated with a second predetermined region and one of the one or more user-position-independent modes may be associated with a third predetermined region. The second predetermined region may be at least partially within the first predetermined region and the third predetermined region may be at least partially outside the first predetermined region.

The second predetermined region nay be within the first predetermined region and the third predetermined region may be outside the first predetermined region.

The determined position of a first user at the first time may be a first determined position and the determined position of the first user at the third time may be a second determined position. The first determined position may be closer to the array of loudspeakers than the second determined position. The selected sound reproduction mode at the second time may be one of the one or more user-position-dependent modes and the selected sound reproduction mode at the fourth time may be one of the one or more user-position-independent modes. In other words, one of the one or more user-position-dependent modes may be associated with positions closer to the array than one of the one or more user-position-independent modes.

The selecting at the second time may comprise determining that a first one of the plurality of users is not positioned within a first predetermined distance of a second one of the plurality of users and, in response, selecting one of the one or more user-position-dependent modes as the selected sound reproduction mode.

The selecting at the fourth time may comprise determining that the first one of the plurality of users is positioned within the first predetermined distance of the second one of the plurality of users and, in response, selecting one of the one or more user-position-independent modes as the selected sound reproduction mode or adjusting the at least one parameter of the selected sound reproduction mode.

The selecting at the second time may comprise determining that a first one of the plurality of users is positioned within a second predetermined distance of a second one of the plurality of users and, in response, selecting one of the one or more user-position-dependent modes as the selected sound reproduction mode. In other words, the one of the one or more user-position-dependent modes is selected when users are sufficiently close together.

The selecting at the fourth time may comprise determining that the first one of the plurality of users is not positioned within the second predetermined distance of the second one of the plurality of users and, in response, selecting one of the one or more user-position-independent modes as the selected sound reproduction mode or adjusting the at least one parameter of the selected sound reproduction mode. In other words, the one of the one or more user-position-independent modes is selected when users are too far apart.

The selecting at the second time may comprise determining that a first one of the plurality of users is positioned within a predetermined range of distances from a second one of the plurality of users and, in response, selecting one of the one or more user-position-dependent modes as the selected sound reproduction mode. In other words, the one of the one or more user-position-dependent modes is selected when users are sufficiently close together, but not too close together.

The selecting at the fourth time may comprise determining that the first one of the plurality of users is not positioned within the predetermined range of distances from the second one of the plurality of users and, in response, selecting one of the one or more user-position-independent modes as the selected sound reproduction mode. In other words, the one of the one or more user-position-independent modes is selected when users are too close together or too far apart.

The selecting at the second time may comprise determining that a first one of the plurality of users is positioned within a predetermined range of distances from a second one of the plurality of users and, in response, selecting one of the one or more user-position-dependent modes as the selected sound reproduction mode. In other words, the one of the one or more user-position-dependent modes is selected when users are sufficiently close together, but not too close together.

The selecting at the fourth time may comprise determining that the first one of the plurality of users is not positioned within the predetermined range of distances from the second one of the plurality of users and, in response, adjusting the at least one parameter of the selected sound reproduction mode. In other words, the at least one parameter of the selected sound reproduction mode is adjusted when users are too close together or too far apart.

When the selected sound reproduction mode is one of the one or more user-position-dependent modes, the output audio signals may be generated by applying a set of filters [e.g., H] to the plurality of input audio signals [e.g., d].

The set of filters may be determined such that, when the output audio signals are output to the array of loudspeakers, substantially only the respective one of the plurality of input audio signals is reproduced at each of the plurality of control points.

The set of filters may be digital filters. The set of filters may be applied in the frequency domain.

The set of filters [e.g., H] may be time-varying. Alternatively, the set of filters [e.g., H] may be fixed or time-invariant, e.g., when listener positions and head orientations are considered to be relatively static.

The set of filters may be based on a plurality of filter elements [e.g., G] comprising a respective filter element for each of the control points and loudspeakers.

Each one of the plurality of filter elements [e.g., G] may be a frequency-independent delay-gain element [e.g., $G_{m,l}=e^{j\omega\tau(x_m,y_l)}g_{m,l}$].

Each one of the plurality of filter elements [e.g., G] may comprise a delay term [e.g., $e^{j\omega\tau(x_m,y_l)}$] and/or a gain term [e.g., $g_{m,l}$] that is based on the relative position [e.g., $x_m$] of one of the control points and one of the loudspeakers [e.g., $y_l$].

Each one of the plurality of filter elements [e.g., G] may comprise an approximation of a respective transfer function [e.g., $S_{m,l}(\omega)$] between an audio signal applied to a respective one of the loudspeakers and an audio signal received at a respective one of the control points from the respective one of the loudspeakers.

The approximation may be based on a free-field acoustic propagation model and/or a point-source acoustic propagation model.

The approximation may account for one or more of reflections, refraction, diffraction or scattering of sound in the acoustic environment. The approximation may alternatively or additionally account for scattering from a head of one or more listeners. The approximation may alternatively or additionally account for one or more of a frequency response of each of the loudspeakers or a directivity pattern of each of the loudspeakers.

The approximation may be based on one or more head-related transfer functions, HRTFs. The one or more HRTFs may be measured HRTFs. The one or more HRTFs may be simulated HRTFs. The one or more HRTFs may be determined using a boundary element model of a head.

The plurality of filter elements may be determined by measuring the set of transfer functions.

A filter element may be a weight of a filter. A plurality of filter elements may be any set of filter weights. A filter element may be any component of a weight of a filter. A plurality of filter elements may be a plurality of components of respective weights of a filter.

Generating the respective output audio signal for each of the loudspeakers in the array may comprise:

generating a respective intermediate audio signal for each of the control points [e.g., m] by applying the or a first subset of filters [e.g., $[GG^H]^{-1}$] to the input audio signals [e.g., d]; and generating the respective output audio signal for each of the loudspeakers by applying the or a second subset of filters [e.g., $G^H$] to the intermediate audio signals.

The set of filters or the first subset of filters [e.g., $[GG^H]^{-1}$] may be determined based on an inverse of a matrix [e.g., $[GG^H]$] containing the plurality of filter elements [e.g., G].

The matrix [e.g., $[GG^H]$] containing the plurality of filter elements [e.g., G] may be regularised prior to being inverted [e.g., by regularisation matrix A].

The set of filters may be determined based on:

in the frequency domain, a product of the or a matrix [e.g., $G^H$] containing the plurality of filter elements [e.g., G] and the inverse of the or a matrix [e.g., $[GG^H]$] containing the plurality of filter elements [e.g., G]; or an equivalent operation in the time domain.

The set of filters may be determined using an optimisation technique.

The output audio signal for a particular loudspeaker in the array of loudspeakers may be based on each of the at least one input audio signals.

When the selected sound reproduction mode is the surround sound mode, the generating may comprise generating beams that are targeted towards acoustically reflective surfaces in the listening environment.

The at least one input audio signal may comprise a (or the) multichannel audio signal. When the selected sound reproduction mode is the matrixing mode or the stereo mode, the generating may comprise generating each output audio signal based on a respective channel of the multichannel audio signal.

The method may further comprise outputting the output audio signals [e.g., Hd or q] to the array of loudspeakers.

The method may further comprise receiving the set of filters [e.g., H], e.g., from another processing device, or from a filter determining module. The method may further comprise determining the set of filters [e.g., H].

The method may further comprise determining any of the variables listed herein. These variables may be determined using any of the equations set out herein.

There is provided an apparatus configured to perform any of the methods described herein.

The apparatus may comprise a processor configured to perform any of the methods described herein.

The apparatus may comprise a digital signal processor configured to perform any of the methods described herein.

The apparatus may comprise the array of loudspeakers.

The apparatus may be coupled, or may be configured to be coupled, to the loudspeaker array.

There is provided a computer program comprising instructions which, when executed by a processing system, cause the processing system to perform any of the methods described herein.

There is provided a (non-transitory) computer-readable medium or a data carrier signal comprising the computer program.

In some implementations, the various methods described above are implemented by a computer program. In some implementations, the computer program includes computer code arranged to instruct a computer to perform the functions of one or more of the various methods described above. In some implementations, the computer program and/or the code for performing such methods is provided to an apparatus, such as a computer, on one or more computer-readable media or, more generally, a computer program product. The computer-readable media is transitory or non-transitory. The one or more computer-readable media could be, for example, an electronic, magnetic, optical, electromagnetic, infrared, or semiconductor system, or a propagation medium for data transmission, for example for downloading the code over the Internet. Alternatively, the one or more computer-readable media could take the form of one or more physical computer-readable media such as semiconductor or solid-state memory, magnetic tape, a removable computer diskette, a random-access memory (RAM), a read-only memory (ROM), a rigid magnetic disc, or an optical disk, such as a CD-ROM, CD-R/W or DVD.

In an implementation, the modules, components and other features described herein are implemented as discrete components or integrated in the functionality of hardware components such as ASICS, FPGAs, DSPs or similar devices.

A 'hardware component' is a tangible (e.g., non-transitory) physical component (e.g., a set of one or more processors) capable of performing certain operations and configured or arranged in a certain physical manner. In some implementations, a hardware component includes dedicated circuitry or logic that is permanently configured to perform certain operations. In some implementations, a hardware component is or includes a special-purpose processor, such as a field programmable gate array (FPGA) or an ASIC. In some implementations, a hardware component also includes programmable logic or circuitry that is temporarily configured by software to perform certain operations.

Accordingly, the term 'hardware component' should be understood to encompass a tangible entity that is physically constructed, permanently configured (e.g., hardwired), or temporarily configured (e.g., programmed) to operate in a certain manner or to perform certain operations described herein.

In addition, in some implementations, the modules and components are implemented as firmware or functional circuitry within hardware devices. Further, in some implementations, the modules and components are implemented in any combination of hardware devices and software components, or only in software (e.g., code stored or otherwise embodied in a machine-readable medium or in a transmission medium).

In the present disclosure, when a particular sound reproduction mode is described as being the 'selected' sound reproduction mode under particular circumstances (e.g., when a particular number of users are present and/or the users are in particular positions), it should be understood that that particular sound reproduction mode may in fact be selected based on, or responsive to, a determination that those circumstances apply.

It will be appreciated that, although various approaches above may be implicitly or explicitly described as 'optimal', engineering involves trade-offs and so an approach which is optimal from one perspective may not be optimal from another. Furthermore, approaches which are slightly sub-optimal may nevertheless be useful. As a result, both optimal and sub-optimal solutions should be considered as being within the scope of the present disclosure.

Those skilled in the art will recognise that a wide variety of modifications, alterations, and combinations can be made with respect to the above described examples without departing from the scope of the disclosed concepts, and that such modifications, alterations, and combinations are to be viewed as being within the scope of the present disclosure.

Those skilled in the art will also recognise that the scope of the invention is not limited by the examples described herein, but is instead defined by the appended claims.

Examples of the present disclosure are set out in the following numbered clauses.

1. A computer-implemented method of generating audio signals for an array of loudspeakers positioned in a listening environment, the method comprising:
 - receiving at least one input audio signal;
 - determining at least one of:
   - a number of users in the listening environment, or
   - a respective position of each of one or more users in the listening environment;
 - based on the at least one of the number of users or the respective position of each of the one or more users in the listening environment, selecting a sound reproduction mode from a set of predetermined sound reproduction modes of the array of loudspeakers; and
 - generating a respective output audio signal for each of the loudspeakers in the array of loudspeakers based on at least a portion of the at least one input audio signal, wherein the output audio signals are generated according to the selected sound reproduction mode.

2. The method of clause 1, wherein the determining comprises determining the number of users in the listening environment.

3. The method of clause 2, wherein each of the sound reproduction modes is associated with a number, or a range of numbers, of users, and wherein the selected sound reproduction mode is selected from the one or more predetermined sound reproduction modes associated with the determined number of users.

4. The method of any preceding clause, wherein the determining comprises determining the number of users in a predetermined region of the listening environment or within a predetermined range of the array of loudspeakers.

5. The method of any preceding clause, wherein the determining comprises determining the respective position of each of the one or more users in the listening environment.

6. The method of clause 5, wherein each of the predetermined sound reproduction modes is associated with a respective one of a plurality of predetermined regions, and wherein the selected sound reproduction mode is associated with one of the plurality of predetermined regions in which at least one of the one or more users is positioned.

7. The method of any of clauses 5 to 6, wherein the selecting comprises, based on the respective position of each of the one or more users in the listening environment, determining a number of users positioned in a predetermined region of the listening environment or within a predetermined range of the array of loudspeakers, and wherein the selected sound reproduction mode is selected based on the number of users in the predetermined region of the listening environment or within the predetermined range of the array of loudspeakers.

8. The method of any of clauses 5 to 7, wherein the selected sound reproduction mode is a first sound reproduction mode, the method further comprising:
 - responsive to determining that the position of at least one of the one or more users is outside an outer boundary of a first predetermined region associated with the first sound reproduction mode, selecting a second sound reproduction mode and repeating the generating according to the selected second sound reproduction mode;
 - responsive to determining that the position of at least one of the one or more users is within an inner boundary of the first predetermined region, selecting the first sound reproduction mode and repeating the generating according to the selected first sound reproduction mode.

9. The method of any of clauses 5 to 8, wherein the respective position of each of the one or more users is a position of the one or more users with respect to the array of loudspeakers.

10. The method of any of clauses 5 to 8, wherein the one or more users in the listening environment comprise a plurality of users, and wherein the position of one of the plurality of users is a position of the one of the plurality of users with respect to another one of the plurality of users.

11. The method of any preceding clause, wherein at least one parameter of the selected sound reproduction mode is set based on at least one of the number of users or the respective position of each of the one or more users in the listening environment.

12. The method of any preceding clause, wherein the determining is based on a signal captured by a sensor.

13. The method of clause 12, wherein the sensor is an image sensor.

14. The method of any preceding clause, wherein the determining is at a first time and the selecting is at a second time, and wherein the method further comprises:
 - at a third time, determining at least one of the number of users in the listening environment and the respective position of each of the one or more users in the listening environment;
 - at a fourth time, repeating the selecting based on the at least one of the number of users or the respective position of each of the one or more users in the listening environment at the third time; and
 - repeating the generating based on the selecting at the fourth time.

15. The method of clause 14, wherein the third time is a given time period after the first time and the fourth time is the given period after the second time, wherein the given time period is based on a sampling frequency of an or the image sensor.

16. The method of any preceding clause, wherein the at least one input audio signal comprises a multichannel audio signal.

17. The method of any preceding clause, wherein the set of predetermined sound reproduction modes comprises at least one of:
 - one or more user-position-independent modes; or
 - one or more user-position-dependent modes.

18. The method of clause 17, wherein the one or more user-position-independent modes comprise at least one of:
   a stereo mode;
   a surround sound mode; or
   a matrixing mode.

19. The method of any of clauses 17 to 18, wherein the at least one input audio signal comprises a plurality of input audio signals and wherein, when the selected sound reproduction mode is one of the one or more user-position-dependent modes, a respective one of the plurality of input audio signals is to be reproduced, by the array of loudspeakers, at each of a plurality of control points in the listening environment.

20. The method of clause 19, wherein the one or more user-position-dependent modes comprise at least one of:
   a personal audio mode in which the plurality of control points are positioned at the positions of the users; or
   a binaural mode in which the plurality of control points are positioned at ears of the users.

21. The method of any of clauses 17 to 20 when dependent on clause 14,
   wherein the determined number of users at the first time is a first determined number of users and the determined number of users at the third time is a second determined number of users, the second determined number of users being higher than the first determined number of users, and
   wherein the selected sound reproduction mode at the second time is one of the one or more user-position-dependent modes, and
   the selected sound reproduction mode at the fourth time is one of the one or more user-position-independent modes.

22. The method of any of clauses 17 to 21, wherein one of the one or more user-position-dependent modes is associated with a predetermined region which is closer to the array of loudspeakers than another predetermined region associated with one of the one or more user-position-independent modes.

23. The method of any of clauses 17 to 21 when dependent on clauses 10 and 14,
   wherein the selecting at the second time comprises determining that a first one of the plurality of users is positioned within a predetermined range of distances from a second one of the plurality of users and, in response, selecting one of the one or more user-position-dependent modes as the selected sound reproduction mode,
   wherein the selecting at the fourth time comprises determining that the first one of the plurality of users is not positioned within the predetermined range of distances from the second one of the plurality of users and, in response, selecting one of the one or more user-position-independent modes as the selected sound reproduction mode.

24. An apparatus configured to perform the method of any preceding clause.

25. A computer program comprising instructions which, when executed by a processing system, cause the processing system to perform the method of any of clauses 1 to 23, or
   a computer-readable medium comprising instructions which, when executed by a processing system, cause the processing system to perform the method of any of clauses 1 to 23, or
   a data carrier signal comprising instructions which, when executed by a processing system, cause the processing system to perform the method of any of clauses 1 to 23.

The invention claimed is:

1. A computer-implemented method of generating audio signals for an array of loudspeakers positioned in a listening environment, the method comprising:
   receiving at least one input audio signal;
   at a first time, determining at least one of:
      a number of users in the listening environment, or
      a respective position of each of one or more users in the listening environment;
   at a second time, based on the at least one of the number of users or the respective position of each of the one or more users in the listening environment, selecting a sound reproduction mode from a set of predetermined sound reproduction modes of the array of loudspeakers, wherein the set of predetermined sound reproduction modes comprises one or more user-position-independent modes and one or more user-position-dependent modes;
   generating a respective output audio signal for each of the loudspeakers in the array of loudspeakers based on at least a portion of the at least one input audio signal, wherein the output audio signals are generated according to the selected sound reproduction mode;
   at a third time, determining at least one of the number of users in the listening environment and the respective position of each of the one or more users in the listening environment;
   at a fourth time, repeating the selecting based on the at least one of the number of users or the respective position of each of the one or more users in the listening environment at the third time; and
   repeating the generating based on the selecting at the fourth time, wherein:
   the determined number of users at the first time is a first determined number of users and the determined number of users at the third time is a second determined number of users, the second determined number of users being higher than the first determined number of users,
   the selected sound reproduction mode at the second time is one of the one or more user-position-dependent modes, and
   the selected sound reproduction mode at the fourth time is one of the one or more user-position-independent modes.

2. The method of claim 1, wherein the determining comprises determining the number of users in the listening environment.

3. The method of claim 2, wherein each of the sound reproduction modes is associated with a number, or a range of numbers, of users, and wherein the selected sound reproduction mode is selected from the one or more predetermined sound reproduction modes associated with the determined number of users.

4. The method of claim 1, wherein the determining comprises determining the number of users in a predetermined region of the listening environment or within a predetermined range of the array of loudspeakers.

5. The method of claim 1, wherein the determining comprises determining the respective position of each of the one or more users in the listening environment.

6. The method of claim 5, wherein each of the predetermined sound reproduction modes is associated with a respective one of a plurality of predetermined regions, and wherein the selected sound reproduction mode is associated with one of the plurality of predetermined regions in which at least one of the one or more users is positioned.

7. The method of claim 5, wherein the selecting comprises, based on the respective position of each of the one or more users in the listening environment, determining a number of users positioned in a predetermined region of the listening environment or within a predetermined range of the array of loudspeakers, and wherein the selected sound reproduction mode is selected based on the number of users in the predetermined region of the listening environment or within the predetermined range of the array of loudspeakers.

8. The method of claim 5, wherein the selected sound reproduction mode is a first sound reproduction mode, the method further comprising:

responsive to determining that the position of at least one of the one or more users is outside an outer boundary of a first predetermined region associated with the first sound reproduction mode, selecting a second sound reproduction mode and repeating the generating according to the selected second sound reproduction mode;

responsive to determining that the position of at least one of the one or more users is within an inner boundary of the first predetermined region, selecting the first sound reproduction mode and repeating the generating according to the selected first sound reproduction mode.

9. The method of claim 5, wherein:

the respective position of each of the one or more users is a position of the one or more users with respect to the array of loudspeakers; or the one or more users in the listening environment comprise a plurality of users, and wherein the position of one of the plurality of users is a position of the one of the plurality of users with respect to another one of the plurality of users.

10. The method of claim 1, wherein at least one parameter of the selected sound reproduction mode is set based on at least one of the number of users or the respective position of each of the one or more users in the listening environment.

11. The method of claim 1, wherein the determining is based on a signal captured by a sensor, and optionally wherein the sensor is an image sensor.

12. The method of claim 1, wherein the third time is a given time period after the first time and the fourth time is the given period after the second time, wherein the given time period is based on a sampling frequency of an image sensor.

13. The method of claim 1, wherein the at least one input audio signal comprises a multichannel audio signal.

14. The method of claim 1, wherein the one or more user-position-independent modes comprise at least one of:

a stereo mode;

a surround sound mode; or a matrixing mode.

15. The method of claim 1, wherein the at least one input audio signal comprises a plurality of input audio signals and wherein, when the selected sound reproduction mode is one of the one or more user-position-dependent modes, a respective one of the plurality of input audio signals is to be reproduced, by the array of loudspeakers, at each of a plurality of control points in the listening environment, and optionally wherein the one or more user-position-dependent modes comprise at least one of:

a personal audio mode in which the plurality of control points are positioned at the positions of the users; or a binaural mode in which the plurality of control points are positioned at ears of the users.

16. The method of claim 1, wherein one of the one or more user-position-dependent modes is associated with a predetermined region which is closer to the array of loudspeakers than another predetermined region associated with one of the one or more user-position-independent modes.

17. An apparatus comprising a processor configured to:

receive at least one input audio signal;

at a first time, determine at least one of:

a number of users in a listening environment, or a respective position of each of one or more users in a listening environment;

at a second time, based on the at least one of the number of users or the respective position of each of the one or more users in the listening environment, select a sound reproduction mode from a set of predetermined sound reproduction modes of an array of loudspeakers positioned in the listening environment, wherein the set of predetermined sound reproduction modes comprises one or more user-position-independent modes and one or more user-position-dependent modes;

generate a respective output audio signal for each of the loudspeakers in the array of loudspeakers based on at least a portion of the at least one input audio signal, wherein the output audio signals are generated according to the selected sound reproduction mode;

at a third time, determine at least one of the number of users in the listening environment and the respective position of each of the one or more users in the listening environment;

at a fourth time, repeat the selecting based on the at least one of the number of users or the respective position of each of the one or more users in the listening environment at the third time; and repeat the generating based on the selecting at the fourth time, wherein:

the determined number of users at the first time is a first determined number of users and the determined number of users at the third time is a second determined number of users, the second determined number of users being higher than the first determined number of users, the selected sound reproduction mode at the second time is one of the one or more user-position-dependent modes, and the selected sound reproduction mode at the fourth time is one of the one or more user-position-independent modes.

18. A non-transitory computer-readable medium comprising instructions which, when executed by a processing system, cause the processing system to:

receive at least one input audio signal;

at a first time, determine at least one of:

a number of users in a listening environment, or a respective position of each of one or more users in a listening environment;

at a second time, based on the at least one of the number of users or the respective position of each of the one or more users in the listening environment, select a sound reproduction mode from a set of predetermined sound reproduction modes of an array of loudspeakers positioned in the listening environment, wherein the set of predetermined sound reproduction modes comprises one or more user-position-independent modes and one or more user-position-dependent modes;

generate a respective output audio signal for each of the loudspeakers in the array of loudspeakers based on at least a portion of the at least one input audio signal, wherein the output audio signals are generated according to the selected sound reproduction mode;

at a third time, determine at least one of the number of users in the listening environment and the respective position of each of the one or more users in the listening environment;

at a fourth time, repeat the selecting based on the at least one of the number of users or the respective position of each of the one or more users in the listening environment at the third time; and repeat the generating based on the selecting at the fourth time, wherein:

the determined number of users at the first time is a first determined number of users and the determined number of users at the third time is a second determined number of users, the second determined number of users being higher than the first determined number of users, the selected sound reproduction mode at the second time is one of the one or more user-position-dependent modes, and the selected sound reproduction mode at the fourth time is one of the one or more user-position-independent modes.

* * * * *